United States Patent [19]

Bauer

[11] Patent Number: 5,184,869
[45] Date of Patent: Feb. 9, 1993

[54] ELEVATABLE SLIDING ROOF OF FLAT DESIGN

[75] Inventor: Kurt Bauer, Eberstadt, Fed. Rep. of Germany

[73] Assignee: Karosseriewerke Weinsberg GmbH, Fed. Rep. of Germany

[21] Appl. No.: 882,296

[22] Filed: May 13, 1992

Related U.S. Application Data

[63] Continuation of Ser. No. 739,731, Jul. 30, 1991, abandoned, which is a continuation of Ser. No. 616,729, Nov. 21, 1990, abandoned, which is a continuation of Ser. No. 340,254, Apr. 19, 1989, abandoned.

[30] Foreign Application Priority Data

Apr. 19, 1988 [DE] Fed. Rep. of Germany ....... 3812955

[51] Int. Cl.⁵ .............................. B60J 7/05; B60J 7/04
[52] U.S. Cl. ..................... 296/213; 49/488; 49/501; 296/214; 296/216; 296/219; 296/221
[58] Field of Search ............... 296/211, 213, 214, 216, 296/219, 221, 222; 49/488, 501

[56] References Cited

U.S. PATENT DOCUMENTS

| | | |
|---|---|---|
| 2,024,192 | 12/1935 | Verhagen ................ 49/488 |
| 3,882,637 | 5/1975 | Lindenschmidt ............ 49/501 |
| 3,894,767 | 7/1975 | Schatzler et al. ............ 296/221 X |
| 4,085,965 | 4/1978 | Schlapp ................ 296/221 X |
| 4,159,144 | 6/1979 | Ehlen et al. ............ 296/222 |
| 4,478,003 | 10/1984 | Flett ................ 49/501 X |
| 4,624,501 | 11/1986 | Niwa et al. ............ 296/216 X |
| 4,646,499 | 3/1987 | Wilson ................ 296/211 X |
| 4,679,846 | 7/1987 | Lux et al. ............ 296/214 |
| 4,702,518 | 10/1987 | Paerisch et al. ............ 296/221 X |
| 4,741,572 | 5/1988 | Bauhof ................ 296/222 X |
| 4,741,573 | 5/1988 | Yokota ................ 296/221 |
| 4,813,737 | 3/1989 | Schlapp ................ 296/214 |

Primary Examiner—Charles A. Marmor
Assistant Examiner—Andrew C. Pike
Attorney, Agent, or Firm—Harness, Dickey & Pierce

[57] ABSTRACT

In order to reduce the installed height of an elevatable sliding roof, guide rails supporting a rigid roof cover in a sliding roof cassette are given an arched shape corresponding to the contour of the vehicle roof. A gutter extending underneath a gap between the rear roof cover edge and the edge of the opening in the roof is shifted toward the rear when the roof cover is lowered into a sliding position. The roof cover consists of two half shells which are glued to each other and a roof cover seal is located along the periphery of the cover.

9 Claims, 5 Drawing Sheets

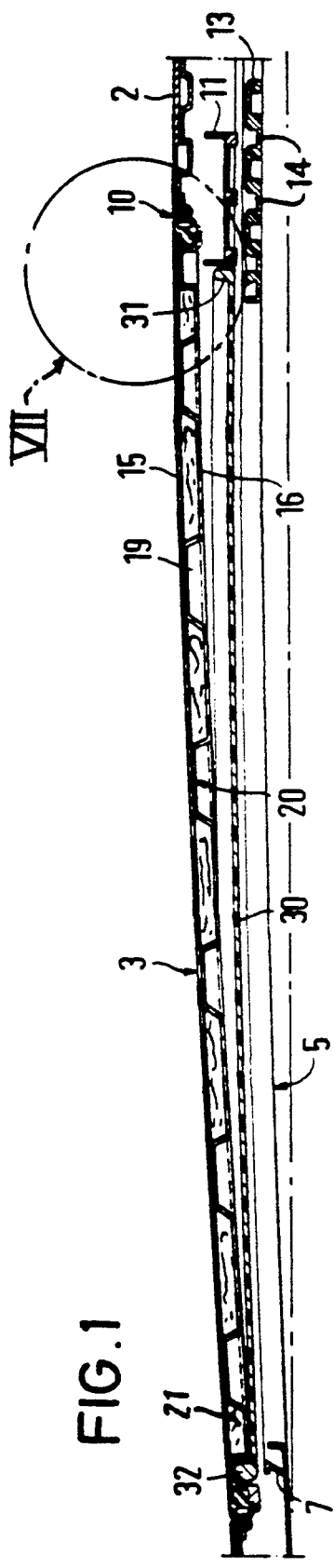
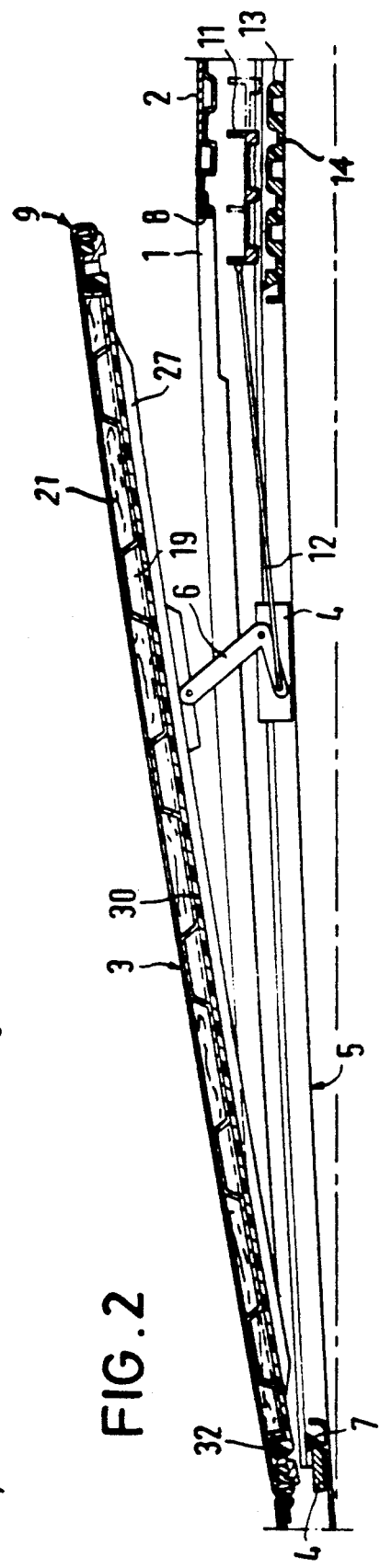
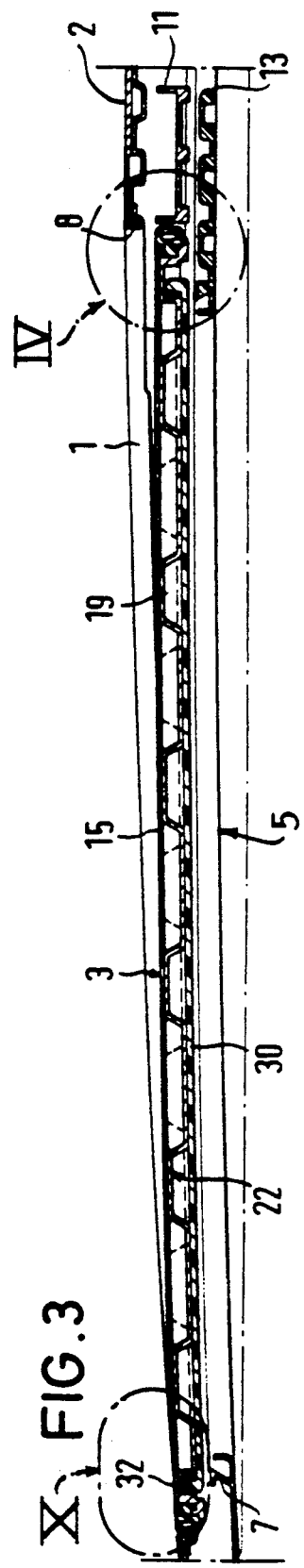

ELEVATABLE SLIDING ROOF OF FLAT DESIGN

This is a continuation of U.S. Pat. application Ser. No. 07/739,731, filed Jul. 30, 1991, now abandoned, which is a continuation of Ser. No. 07/616,729, filed Nov. 21, 1990, now abandoned, which is a continuation of Ser. No. 07/340,254, filed Apr. 19, 1989, now abandoned.

BACKGROUND OF THE INVENTION

The invention relates to an elevatable sliding roof of flat design having a rigid roof cover which is slidably supported with the aid of sliding pads. The roof can be moved from a closed position, in which it lies generally in the contour of the roof, into either a raised ventilating position or into a lowered sliding position.

In present day automotive design, increasing efforts are being made to reduce the overall height of the vehicle body in order to reduce running resistance, to reduce vehicle weight in order to achieve a favorable weight/power ratio, and to simultaneously reduce manufacturing costs. However, the flattening of the silhouette of the vehicle to reduce overall height also causes a reduction in the usable inside height of the vehicle. A number of proposals have therefore been made for the purpose of reducing the installed height of the elevatable sliding roof, but usually only the height of part of the sliding roof is reduced and this does not permit a substantial reduction of the total installed height of the sliding roof. In addition, some of the suggestions that have become known call for measures which either considerably increase the manufacturing and assembly costs or substantially increase the weight of the elevatable sliding roof and which therefore are unsatisfactory. Any proposal requiring a height adjustment for either the sliding roof cassette itself or the guide rails located in it requires an additional drive mechanism and it is not possible to achieve a decisive reduction in the total installed height either by means of special designs of the guide rails and the cover or of the lifting and lowering mechanism alone.

SUMMARY OF THE INVENTION

It is thus an object of the present invention to create an elevatable sliding roof of flat design which permits a definite reduction of the required installed height compared to the known designs of elevatable sliding roofs, and does so without increasing the manufacturing or assembly costs and without an undesirable impairment of the roof functions.

Pursuant to this object and others which will become apparent hereafter, one aspect of the present invention resides in coupling a movable gutter by means of a connecting rod, in particular a pusher rod, with the lifting and lowering mechanism of the roof cover so that while the roof cover is lowered into its sliding position the gutter is shifted so far toward the rear of the vehicle that it no longer overlaps the rear edge of the roof cover. Also, the guide rails which guide the sliding pads that slidingly support the roof cover, as well as the sliding roof cassette containing these guide rails, are arched in accordance with the arched contour of the vehicle roof.

Guide rails guiding the roof cover in the sliding roof cassette, designed such that they conform to the contour of the arch formed by the vehicle roof together with a design in which, when the roof cover is lowered, the gutter is shifted in such a manner that it no longer extends underneath the rear edge of said roof cover, will permit a substantial reduction of the installed height compared to the conventional straight design of the guide rails and a gutter which permanently extends underneath the rear edge of the roof cover.

An additional advantage of this design is that it is also possible to equip the rear transverse edge of the rigid roof cover with a bead-like reinforcement, with the result that the roof cover can be formed from two comparatively flat half shells and can comprise a roof cover seal running along the forward face so that the design of the roof cover and its seal ensure, in spite of sufficient stiffness and reliable sealing of the roof cover, an additional reduction in the installed height of the elevatable sliding roof. The special design of the rigid roof cover permits, in addition, a most desirable reduction of the weight of the elevatable sliding roof.

Taken together, the above characteristics of an elevating sliding roof permit, in addition to a reduction in weight, a considerable reduction in the installed height of the elevatable sliding roof, with the order of magnitude of this reduction being about 30 percent compared to conventional designs.

In the description below the invention is described in detail with the aid of a preferred embodiment shown in the drawings.

BRIEF DESCRIPTION OF THE DRAWINGS

FIG. 1 is a longitudinal cross-section taken generally through line I-I of FIG. 8, showing an elevatable sliding roof pursuant to the present invention with the roof cover in a closed position;

FIG. 2 is a longitudinal cross-section similar to FIG. 1 with the roof cover in an elevated position;

FIG. 3 is a longitudinal cross-section similar to FIG. 1 showing the roof cover in a shifted position;

DETAILED DESCRIPTION OF THE PREFERRED EMBODIMENTS

Figure 4:
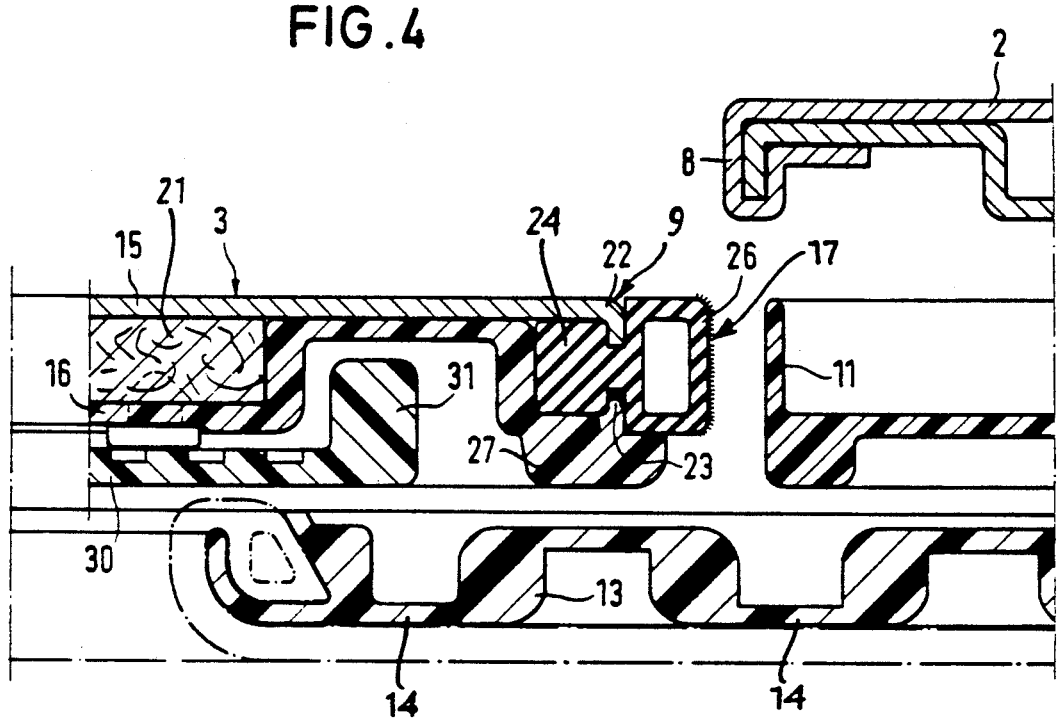
FIG. 4 is an enlarged view of the area indicated by circle IV in FIG. 3.
Figure 7:
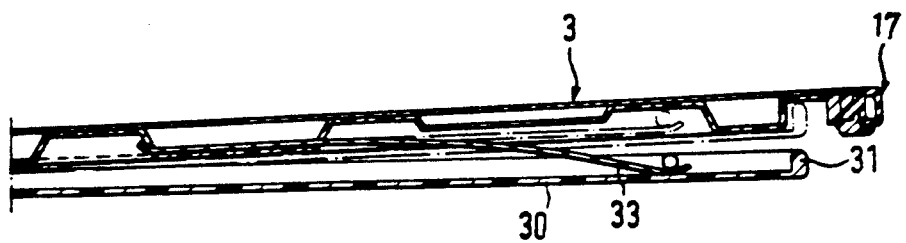
FIG. 7 is an enlarged detailed view of the area indicated by circle VII in FIG. 1 showing a spring clip.
Figure 5:
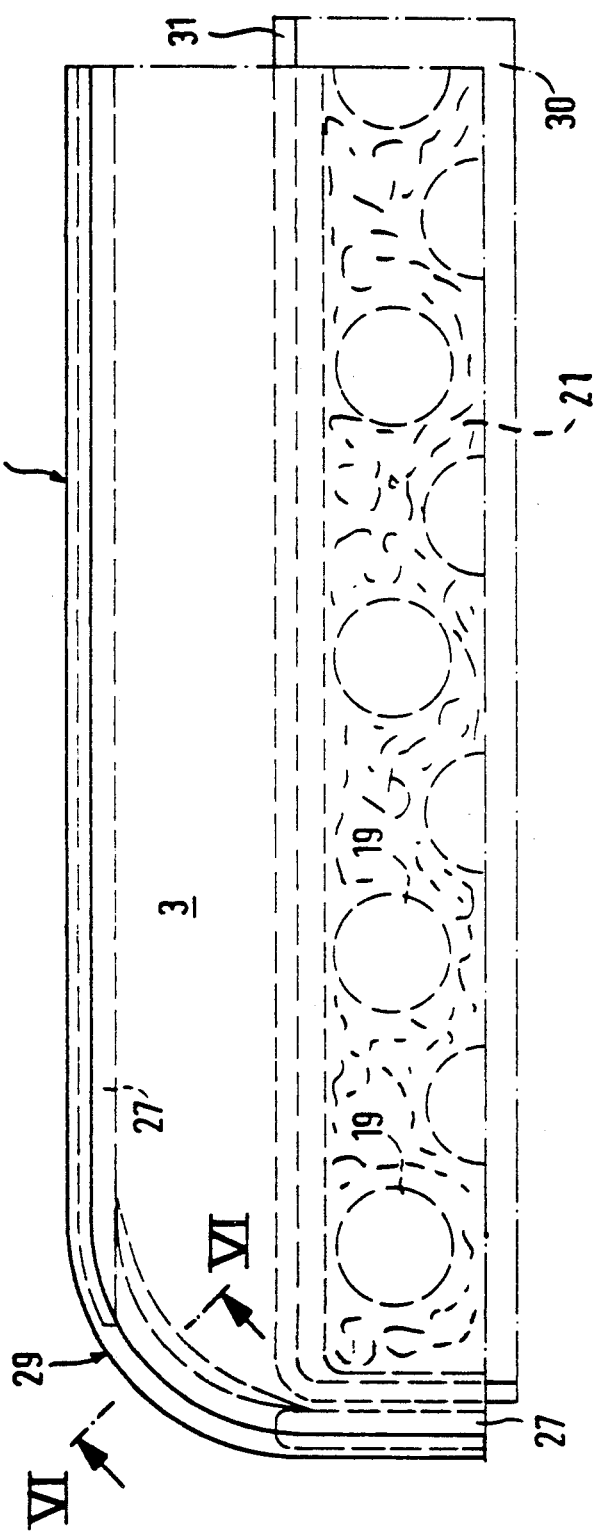
FIG. 5 is a partial top view of the rear end of the roof cover of an elevatable sliding roof according to FIGS. 1 to 4.
Figure 6:
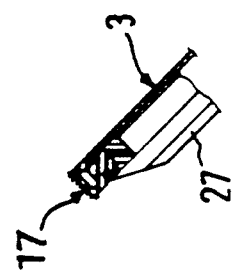
FIG. 6 is a partial section along line VI-VI of the roof cover according to FIG. 5.
Figure 8:
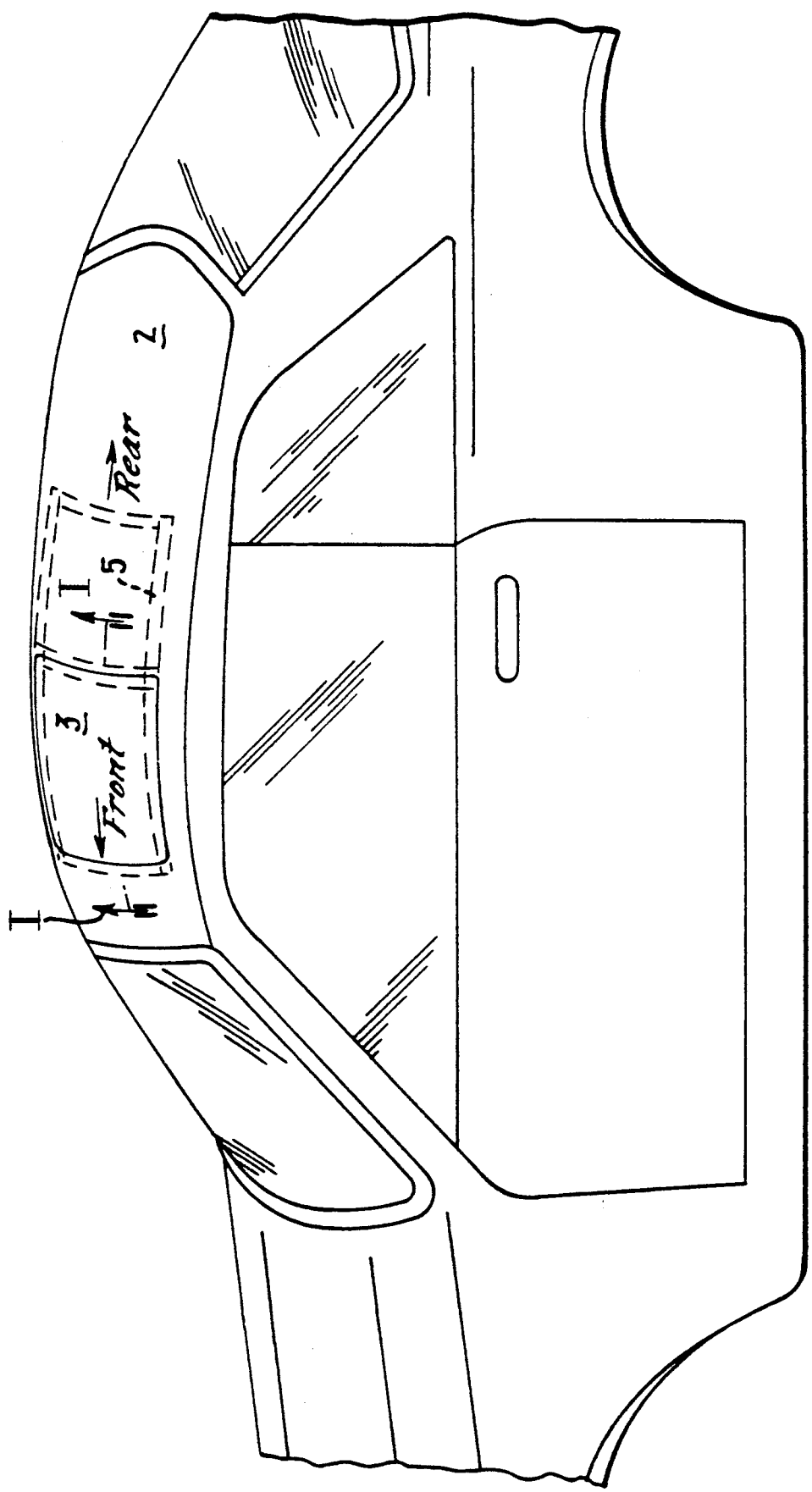
FIG. 8 is a diagrammatic illustration of a motor vehicle incorporating the sliding roof of the present invention.
Figure 9:
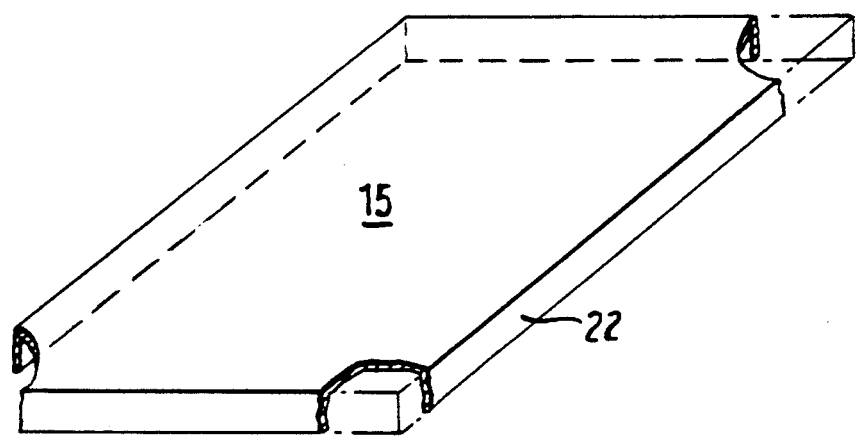
FIG. 9 shows the outer shell of the cover.

Attention is now drawn to FIGS. 1-10 which show a preferred embodiment of the elevatable sliding roof according to the teachings of the present invention. The invention is described in relation to a vehicle in which the invention is adapted to be installed and all references to the front, rear, or sides of the invention are made in reference to the front, rear, and sides of the vehicle as commonly understood.

As can be seen in the drawings, an opening 1 in the roof skin 2 of a vehicle can be closed by means of a rigid roof cover 3. Roof cover 3 rests in front on sliding pads 4 and in the rear on an elevating and lowering mechanism 6 which is disposed on guide rails 7 located in a sliding-roof cassette 5. By means of the elevating and lowering mechanism 6, the roof cover 3 can be elevated from the closed position shown in FIG. 1 into the raised position shown in FIG. 2 or, if desired, lowered into the shifted or sliding position shown in FIG. 3.

As shown in FIGS. 1 to 3, the guide rails 7 and the sliding roof cassette 5 are, from front to rear, generally contoured in accordance with the contour of the vehicle roof. When roof cover 3 is in either of the raised or the closed positions, a gutter 11, which is shiftably supported by the guide rails 7, extends below a gap 10 between a rear edge 8 of the opening 1 and a rear edge 9 of the roof cover 3. The gutter 11 is preferably formed of molded plastic and is connected with the elevating and lowering mechanism 6 of the roof cover 3 by means of a coupling rod 12. This is done in such a manner that, as shown in FIGS. 3 and 4, when the roof cover 3 is lowered, the gutter 11 is shifted rearward beyond the cover's rear edge 9 and no longer extends below the roof cover 3. This makes it possible to increase the distance by which the roof cover 3 is lowered by an amount equal to the heighth of the gutter 11.

A roof frame reinforcement 13 is located in the area of the rear edge 8 of the opening 1 in the vehicle's roof skin 2. Reinforcement 13 is preferably a plastic extrusion, and includes groove-shaped recesses 14 extending substantially parallel to the cover's rear edge 9. In this arrangement, the reinforcement 13 of the roof frame is located underneath the gap 10 between the rear edge 9 of the roof cover 3 and the rear edge 8 of the opening 1 and acts, when the gutter 11 is shifted rearward, as a device for catching and discharging water. For this purpose, it is equipped with connections to the sliding roof cassette which are not shown in the drawings.

In connection with the fact that the gutter is shiftable in relation to the roof cover, provision is also made to ensure that the reinforcement of the roof frame of the vehicle body extends underneath the gap between the roof cover and the rear part of the vehicle roof and is at least partly, as a gutter, provided with a lateral connection to the water removal system of the sliding roof cassette.

The cover 3 is formed by two half shells, an outer shell 15 and an inner shell 16, and is equipped with a roof cover seal 17 along the periphery of the cover 3. The outer roof cover shell 15 is preferably formed of pressed sheet metal and is essentially box-shaped in cross section. The inner roof cover shell 16 is preferably molded plastic and includes a plurality of truncated-conoid-shaped protrusions 19 each having a face 20 which contacts the inner surface of the outer cover shell 15 or is attached to the latter by means of an adhesive. The spaces remaining between the outer cover shell 15 and the inner cover shell 16 are preferably filled with a foam 21 in order to stiffen the roof cover 3.

There are several advantages in having the roof cover 3 formed as described above. This is a first means for increasing the stiffness of the roof cover. A second means for increasing the stiffness of the roof cover is to inject foam into the hollow spaces remaining between the inner and outer shell of the roof cover. In view of the intended reduction in the height of the elevatable sliding roof, an absolutely stiff design of the roof cover 3 is particularly important, as the reduction in the latter's height otherwise would cause an unacceptable loss of stiffness and thus undesirable behavior of the elevatable sliding roof while the vehicle is being operated.

Along the peripheral edge of the roof cover 3, a C-shaped gripping or fastening profile, for a foot portion 24 of a roof cover seal 17 placed along the periphery of the cover, is formed by a turned-down edge 22 of the outer cover shell 15 and a turned-up bead 23 of the inner cover shell 16. The roof cover seal 17 comprises a foot portion 24 disposed in the fastening profile and a sealing portion 26 which protrudes therefrom. The sealing portion 26 is preferably a hollow-profiled box shape in cross section as shown best in FIG. 4.

To provide additional stiffness, the roof cover 3 also comprises, along with its straight edge sections, rib-shaped reinforcements 27 which, if the inner cover shell 16 is a molded plastic part, are formed by providing thicker material at these points of inner cover shell 16. In the area of the rounded corners 29 of the roof cover 3, the rib-shaped reinforcements 27 are tapered at their ends and blended into the inner roof cover shell as clearly shown in FIGS. 5 and 6 in particular. This ensures that the roof cover 3 will be moved downwards a considerable distance when it is moved into the sliding position.

A roof cover headliner 30 associated with the roof cover 3 is a molded plastic part with a cover 313 on the underside and comprises on its periphery a bead-like reinforcing rib 31 pointing toward the roof cover 3. In the area of the front edge of the roof cover 3, this reinforcing rib 31 acts simultaneously as an articulated joint 32 between the inner cover shell 16 and the cover of the roof cover headliner. When the roof cover 3 is in the closed position, the covering of the roof cover headliner is, in its rear section, held by a wire spring clip 33 in a position that is flush with the general contour of the roof cover headliner. When the roof cover 3 is elevated from or into its closed position, the roof cover headliner 30 is made to pivot so as to lie against inner roof cover shell 16 by means of a catch mechanism (not shown) on the elevating and lowering mechanism 6.

Figure 10:
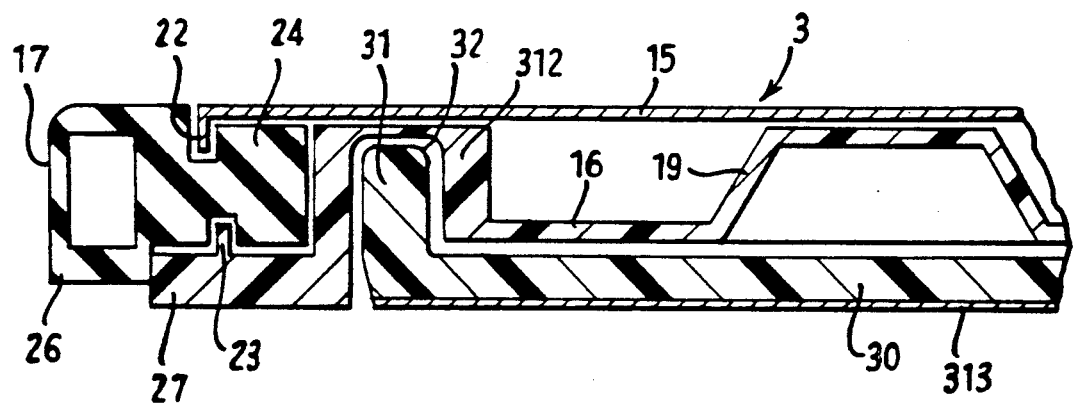
FIG. 10 is an enlarged view of the area indicated by circle X in FIG. 3.

The headliner 30, as shown in FIG. 10, is linked to the roof cover 3 at the front end by the articulated joint 32. The reinforcing rib 31 is held in a groove 312 so that the headliner 30 can pivot slightly with respect to the roof cover. The bottom of the headliner 30 is provided with the cover 313.

In a preferred embodiment of the invention, the interior cover of the headliner of the roof cover is formed by a rigid plate whose lower surface is provided with a coating and whose forward end is fastened to the roof cover in such a way that it can be pivoted around an axis located transversely to the driving direction and is, when the roof cover is in the closed position, held at its rear edge by means of a wire spring clip, in a position which is in line with the contour of the headliner of the vehicle roof. In this design, catching means are provided on the lifting and lowering mechanism of the roof cover which make the roof cover headliner, by its rear edge, pivot to lie on the roof cover when said roof cover is moved from its closed position.

Taken together, the above characteristics of an elevating sliding roof permit, in addition to a reduction in weight, a considerable reduction in the installed height of the elevatable sliding roof, with the order of magnitude of this reduction being about 30 percent compared to conventional designs.

While the invention has been illustrated and described as embodied in an elevatable sliding roof of flat design, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed and desired to be protected by letters patent is set forth in the appended claims.

1. An elevatable sliding roof of a flat design, for a roof opening in a motor vehicle roof which has an arched contour toward a front of a motor vehicle, comprising:
   a rigid roof cover;
   a sliding roof cassette, said sliding roof cassette being arched in accordance with the arched contour of the vehicle roof;
   guide rails located in said sliding roof cassette, said guide rails being arched in accordance with the arched contour of the vehicle roof;
   means for slidably supporting said roof cover, said supporting means including sliding pads provided on said guide rails;
   elevating and lowering means for moving said roof cover from a closed position in which said roof cover lies in the contour of the motor vehicle roof into one of a raised ventilating position and a lowered sliding position;
   a headliner cover associated with said roof cover and being pivotable relative to said roof cover;
   a gutter provided so as to extend underneath a gap between a rear section of the vehicle roof and a rear edge of the roof cover, said gutter being shiftable at least jointly with the roof cover, said rigid roof cover being formed by two joined half shells, including an inner half shell, and with a fastening profile for a roof cover seal located along a peripheral edge of the roof cover;
   a pusher rod connected at one end to said shiftable gutter and at another end to said elevating and lowering means so that when said roof cover is in the lowered sliding position thereof said gutter is shifted rearward so that said gutter no longer extends underneath the rear edge of the roof cover; and
   a mating joint provided so as to fasten the two half shells to each other so that local hollow spaces exist between the two half shells, said roof cover including first stiffening means including a foam filling provided in the local hollow spaces between the two half shells, and second stiffening means including a reinforcement of the inner shell, said reinforcement being located along straight sections of the peripheral edge.

2. An elevatable sliding roof according to claim 1, wherein the headliner cover of the roof cover is formed by a rigid plate having a forward end fastenable to said roof cover; and further comprising spring means for holding said plate at a rear edge thereof in a position so that said plate is flush with a headliner of the vehicle roof when said roof cover is in the closed position thereof.

3. An elevatable sliding roof according to claim 1, wherein said inner half shell is a molded part of a plastic material, said reinforcement of said second stiffening means being rib-shaped reinforcements formed of the material of said inner shell.

4. An elevatable sliding roof according to claim 3, wherein said rib-shaped reinforcements have, in an area of corners of said roof cover, ends blended into a plane of said inner shell so as to form a small angle.

5. An elevatable sliding roof according to claim 1, wherein the vehicle roof has a roof frame reinforcement located near a rear edge of the roof opening, the roof frame reinforcement being formed as a gutter provided so as to extend underneath the gap between the rear edge of said rigid roof cover and the rear section of the vehicle roof.

6. An elevatable sliding roof according to claim 1, wherein said two half shells further include an outer roof cover shell, said inner shell being a molded plastic part having local protrusions each with a truncated conical shape and with a face which is contactable with said outer roof cover shell, said outer shell being made of sheet metal.

7. An elevatable sliding roof according to claim 1, wherein the rigid roof cover has a thickness, said shiftable gutter being a molded plastic part having a total vertical height which corresponds to the thickness of said rigid roof cover.

8. An elevatable sliding roof according to claim 1, wherein the roof cover seal along the peripheral edge of the roof cover includes a foot portion and a hollow-profile portion, said two half shells forming along the peripheral edge of said roof cover, a C-shaped fastening profile for said roof cover seal.

9. An elevatable sliding roof according to claim 1, wherein said headliner cover has a periphery with a bead-like reinforcing rib arranged so as to point toward said inner shell, a section of said bead-like reinforcing rib being parallel to a forward edge of said roof cover so as to simultaneously act as a pivoting joing between said headliner cover and said inner shell.

* * * * *

UNITED STATES PATENT AND TRADEMARK OFFICE
CERTIFICATE OF CORRECTION

PATENT NO. : 5,184,869
DATED : February 9, 1993
INVENTOR(S) : Kurt Bauer It is certified that error appears in the above-identified patent and that said Letters Patent is hereby corrected as shown below:

Column 3, line 22, "heighth" should be -- height --.

Column 6, line 51, "joing" should be -- joint --.

Signed and Sealed this

Twenty-first Day of December, 1993

*Attest:*

BRUCE LEHMAN

*Attesting Officer*     *Commissioner of Patents and Trademarks*